United States Patent [19]
Michalko

[11] 3,837,206
[45] Sept. 24, 1974

[54] METHOD AND APPARATUS FOR CRIMPING BATTERY CASINGS

[75] Inventor: Ignatius Michalko, Ossining, N.Y.

[73] Assignee: Power Conversion, Inc., Mt. Vernon, N.Y.

[22] Filed: June 7, 1973

[21] Appl. No.: 367,752

[52] U.S. Cl................. 72/348, 72/354, 113/120 R
[51] Int. Cl............................................. B21d 19/12
[58] Field of Search............ 72/348, 352, 354, 353, 72/358, 359; 113/120 AA, 121 A; 136/133, 175

[56] References Cited
UNITED STATES PATENTS

| | | | |
|---|---|---|---|
| 1,672,301 | 6/1928 | Cain, Jr. | 136/1 |
| 2,276,684 | 3/1942 | Bellg | 72/354 |
| 2,282,959 | 5/1942 | Gibbs | 113/121 A |
| 2,307,762 | 1/1943 | Deibel | 136/175 |
| 2,564,193 | 8/1951 | Delaval | 72/352 |
| 2,800,344 | 7/1957 | Wolcott | 72/352 |
| 2,972,971 | 2/1961 | Hillgren | 72/356 |
| 3,344,647 | 10/1967 | Berger | 72/354 |
| 3,417,595 | 12/1968 | Saunders | 113/120 AA |
| 3,554,813 | 1/1971 | Feldhake | 136/133 |

Primary Examiner—Richard J. Herbst
Attorney, Agent, or Firm—Sandoe, Hopgood & Calimafde

[57] ABSTRACT

Battery casings are crimped by an apparatus including a holder having a cylindrical bore in which the casings are received, a spring which biases the holder toward a predetermined position, a blocking member which projects into one end of the holder and a plunger which engages the opposite end of the holder to move it against the force of the spring. The battery casing to be crimped is inserted within the holder and completely contained within the bore. When the plunger engages the holder, it crimps the upper rim of the casing inwardly while the casing is held against outward deformation of its sidewalls by the holder.

3 Claims, 3 Drawing Figures

METHOD AND APPARATUS FOR CRIMPING BATTERY CASINGS

BACKGROUND OF THE INVENTION

The present invention relates to apparatus for crimping battery casings, and more particularly an apparatus in which battery casings are held within the cylindrical bore of a reciprocable holder while being crimped.

There is an established and long felt need for an apparatus which will simply and efficiently accomplish the task of crimping the upper edges of cylindrical metal battery casings to close and seal the battery. Because batteries must be inexpensive and are produced in large quantities, the device must operate rapidly and reliably, especially where the battery seal formed by crimping is used to contain volatile electrochemical system components. Batteries of this type are disclosed in allowed U.S. Pat. application Ser. No. 203,976 filed on Dec. 2, 1971, and entitled Method for Filling Sealed Batteries.

When batteries are crimped by compression, a persistent problem is the tendency of the casing side walls to deform outwardly in response to the compressive forces. Presently known devices do not adequately deal with this problem and permit deformation of the side walls along at least a part of their length.

SUMMARY OF THE INVENTION

The present invention provides very simple, yet fast and reliable apparatus for crimping battery casings in which the entire sidewall of the casing is confined within a cylindrical bore throughout the crimping operation thus preventing outward deformation. The apparatus comprises a holder defining the cylindrical bore in which the casing is received, this holder having first and second open ends. The holder is biased toward a predetermined position by resilient means. A blocking member projects into a first open end of the holder, and a reciprocable plunger means is provided for engaging the second open end of the holder and moving it against the force of the resilient means, thereby increasing the extent to which the blocking member projects into the first open end and crimping the sidewalls of the casing compressed therein.

The resilient means may comprise a coil spring which encircles the holder and presses against a base. In a preferred embodiment, this base is disc-shaped and rotates intermittently to bring successive similar holders beneath the reciprocating plunger. The position of the blocking member within the holder may be predetermined by a ramp aligned with the plunger to engage the blocking member as the base rotates.

BRIEF DESCRIPTION OF THE DRAWINGS

For an understanding of the additional aspects of the invention, reference may be made to the description below taken in conjunction with the appended drawings wherein.

DESCRIPTION OF THE PREFERRED EMBODIMENT

Figure 1:
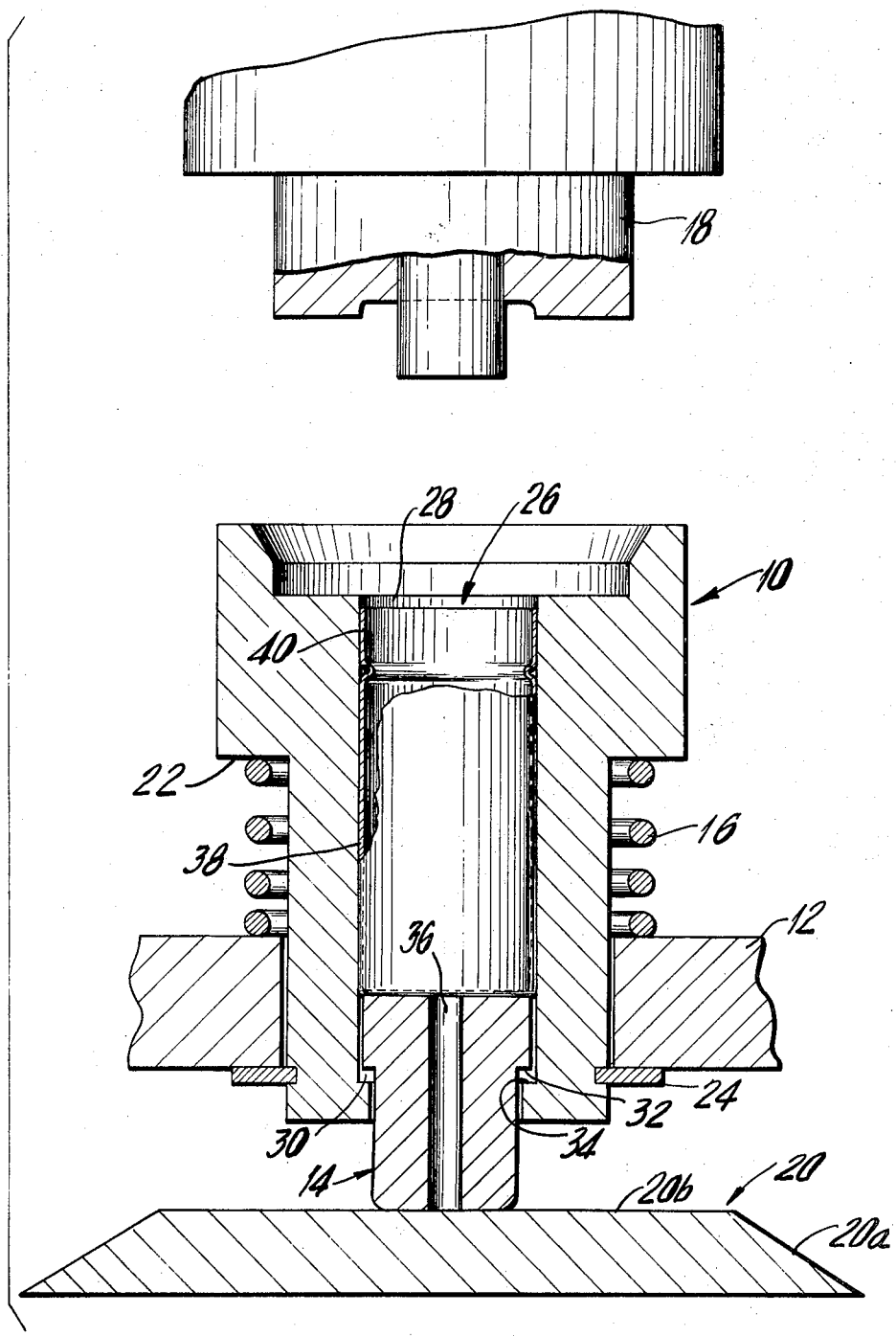
FIGS. 1 and 2 show a battery crimping apparatus constructed in accordance with the invention in two phases of its operation.
Figure 2:
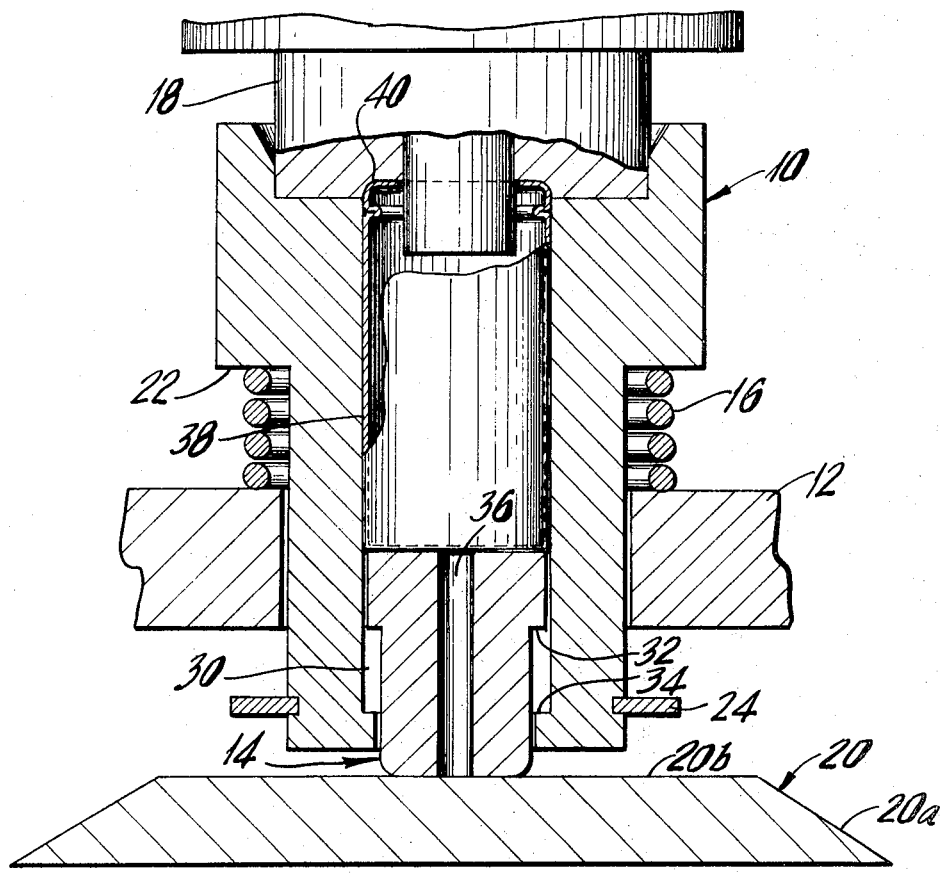
Figure 3:
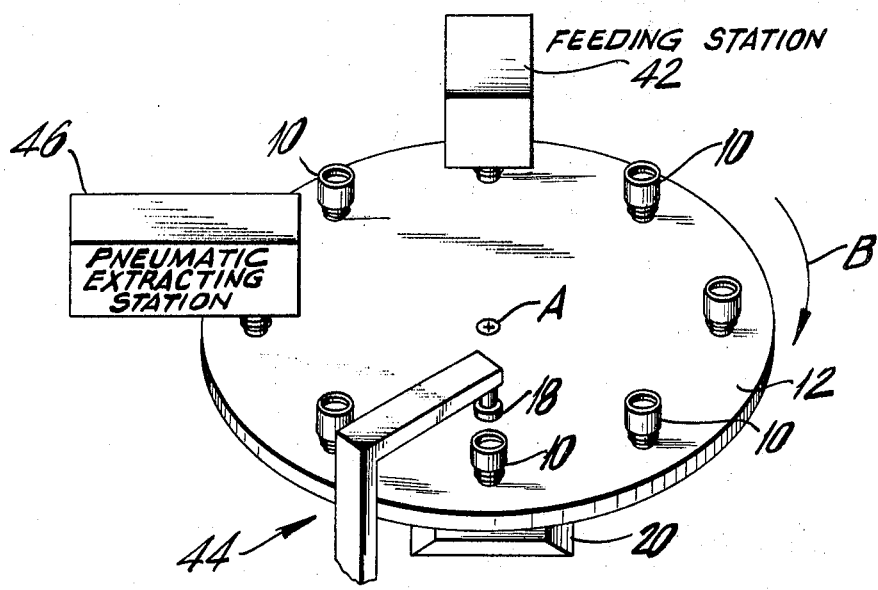
FIG. 3 shows a preferred embodiment of the invention incorporating the apparatus of FIGS. 1 and 2.

FIGS. 1 and 2 show an apparatus for crimping battery casings in two phases of its operation. The apparatus includes a holder 10, a base 12, a blocking member 14, a resilient means 16, a reciprocable plunger 18, and a ramp 20.

The holder 10 is reciprocably journaled in the base 12 and has an outer downwardly facing peripheral shoulder 22. The resilient means 16 takes the form of a coil spring that encircles the holder 10 and bears at its opposite ends against the shoulder 22 and the base 12 to urge the holder 10 upwardly toward a predetermined position (shown in FIG. 1) at which its upward travel is limited by a stop 24 that engages the lower surface of the base 12. (Terms such as upward and lower are used herein with reference to the appended drawings, but it should be understood that the apparatus could have other orientations.)

The holder 10 defines a hollow cylindrical bore 26 and has first and second open ends 28 and 30, respectively. The blocking member 14 is loosely journaled in the lower, first end 28, so as to be reciprocable therein. The downward travel of the blocking member 14 is limited by shoulders 32 and 34 on the outer surface of the blocking member and the inner surface of the holder 10, respectively. A flat surface 20b atop the ram 20 engages the blocking member 14 at a position slightly above the farthest extent of its downward travel. An opening 36 that extends axially through the blocking member 14 permits the free passage of air into and out of the interior of the bore 26. The plunger 18 is contoured for engagement with the first open end 28 of the holder 10.

The apparatus of FIGS. 1 and 2 operates as follows. The base 12 is translated horizontally to move the blocking member 14 into engagement with the inclined portion 20a of the ramp 20 and then into engagement with the raised flat portion 20b thereof, thus reaching the position shown in FIG. 1. This predetermines the position of the blocking member 14 with respect to the holder 10, also carried by the base 12. A battery casing 38 to be crimped is carried within the bore 26 of the holder 10. The entire casing 38 is contained with the bore 26.

Next, the plunger 18 moves downwardly into engagement with the second open end 30 of the holder 10 causing the holder to move against the force of the spring 16 within a channel defined by the base 12. When the plunger 18 has moved to the full extent of its downward travel (the position shown in FIG. 2) the predetermined axial distance between the top of the plunger 18 and the second open end 30 of the holder 10 is less than the length of the uncrimped casing 38. Thus, the rim 40 at the upper end of the casing 38 is crimped and bent inwardly by engagement with a concaved circular recess carried by the plunger 18. The side walls of the casing 38 can not deform outwardly under the compressive force of the plunger 18 because it is at all times completely confined within the bore 26.

After the casing 38 is crimped, the plunger 18 reciprocates upwardly, and the base 12 carries the holder 10, blocking member 14 and casing 38 horizontally away from the ramp 20. The crimped casing 38 may then be readily extracted from the holder 10 by the force of compressed air directed through the opening 36 in the blocking member 14 which drops away from the lower end of the casing once it has disengaged the ramp 20.

In a preferred embodiment, the base 12 is circular and carries a plurality of similar holders 10 spaced about its perimeter. The base 12 rotates intermittently about a center point A in the direction of an arrow B. As each holder 10 passes a feeding station 42, an uncrimped casing 38 is inserted therein. It is then moved to a work station 44 where the casing 38 is crimped as explained above, and finally the casing is extracted with the aid of compressed air at a station 46.

The entire apparatus may be controlled and actuated by conventional electro-mechanical or pneumatic systems. It has desirable simplicity from both kinetic and structural viewpoints which accomplishes the crimping operation with speed reliability and efficiency.

Numerous variations and modifications of the exemplary apparatus described above will occur to those skilled in the art. However, the scope of the invention should not be deemed to be limited except as set forth in the following claims.

I claim:

1. An apparatus for crimping battery casings comprising a holder hving first and second open ends and defining a cylindrical bore for receiving and confining the full length of an uncrimped cylindrical battery casing therein when in a predetermined position, resilient means for biasing the holder toward said predetermined position, a blocking member reciprocably movable with respect to the holder and projecting into the first open end of the holder, a movable base engaged by said resilient means, said base defining a channel within which the holder is reciprocably movable, a surface engageable by the blocking member to establish the position of the blocking member with respect to the holder in response to relative movement between the holder and said surface, and a reciprocable plunger means for engaging the second open end of the holder and moving said holder against the force of the resilient means thus increasing the extent to which the blocking member projects into said first open end and crimping the rim of the casing while at all times preventing outward deformation of the casing sidewalls.

2. The apparatus of claim 1, wherein the resilient means comprises a coil spring that encircles the holder.

3. The apparatus of claim 1, wherein the base is disc-shaped and rotatable to bring the holder into alignment with the plunger.

* * * * *